3,042,534
REFRACTORY BRICK AND PROCESS

Russell Pearce Heuer, Bryn Mawr, Pa., assignor to General Refractories Company, a corporation of Pennsylvania
No Drawing. Filed Aug. 14, 1959, Ser. No. 833,674
Claims priority, application Union of South Africa May 4, 1959
12 Claims. (Cl. 106—58)

This invention concerns improvements relating to processes of making basic refractory bricks suitable for use without kiln firing and refractory bricks so made.

The invention is particularly concerned with the making of bricks which employ as a refractory substance calcined magnesia, or a mixture of chrome ore with at least 20 percent of magnesia, and suitable for use in high temperature furnaces, such as open hearth furnaces and electric melting furnaces, without having first been subjected to kiln firing.

A purpose of the invention is to employ a mixture suitable for making such bricks by use of screened particles of magnesia or a mixture of magnesia and chrome ore, which mixture involves super-coarse particles, medium-coarse particles and fine particles, with elimination of particles of intermediate size.

A further purpose is to make the coarse particles substantially coarser than those previously used, to obtain bricks which are more resistant to spalling and other destructive forces present in high temperature furnaces, without at the same time causing the production of defective bricks.

A further purpose is to obtain greater control in the predetermined size distribution of coarse particles by screening crushed and ground magnesia, or magnesia and chrome ore.

A further purpose is to prevent differences in properties of basic refractory brick which are capable of use without kiln firing due to differences in hardness and crushing resistance of the refractory material, thus assuring uniformity and reproducibility of such refractory brick to an extent not previously possible.

Further purposes appear in the specification and in the claims.

In the prior art in manufacture of refractory brick from magnesia, or mixtures of magnesia and chrome ore, screened particles have previously been proposed which include coarse particles passing through a 6 mesh screen or an 8 mesh screen and resting on a 28 mesh screen, fine particles passing through a 48 mesh screen, and having a low proportion of or free from intermediate size particles between 28 mesh and 48 mesh.

In experiments, I have attempted to increase the size of the conventional coarse particles by screening them so that they will pass through a screen of 5 mesh in some cases, 4 mesh in some cases, and 3.5 mesh in other cases, and in each instance rest on 28 mesh. The resulting brick have proved impractical because the properties of the refractory material vary greatly depending upon the nature of the magnesia source and the chrome ore source. The variation is in initial particle size before crushing and in hardness or resistance to crushing, so that when screening coarse particles in the range between say 5 and 28 mesh, some magnesia and chrome refractory materials run very high in particles which rest on 6 mesh or 8 mesh or 10 mesh, while other magnesia and chrome refractory materials which might be expected to be the same have little or no particles which rest on 6 mesh or 8 mesh or 10 mesh.

As a result the refractory brick made from different lots of refractory and from refractory obtained from different sources in these tests have exhibited non-uniform properties. One difficulty encountered is that in some cases the corners and edges of the bricks have not filled out in molding.

I have carried on further experiments as a result of which I find that this difficulty can be overcome by supplying to the brick mix two separate coarse components. One coarse component passes through a 3 mesh screen or preferably a 3.5 mesh screen and rests at least 90 percent on a 6 mesh screen or preferably an 8 mesh screen. Instead of an 8 mesh screen, a 10 mesh screen may less desirably be used. This component I refer to for convenience herein as super-coarse.

The other coarse component passes at least 90 percent through a 6 mesh screen or preferably through an 8 mesh screen (less desirably through a 10 mesh screen) and rests on a 28 mesh screen. This component for convenience I refer to herein as medium-coarse.

The super-coarse and medium-coarse components are mixed in definite proportions by weight and the coarse and fine particles are provided in definite proportion by weight. In this manner an increase in the size of the coarse particles is obtained controllably, without the difficulties which have previously been encountered in the tests mentioned above.

I have discovered that satisfactory basic refractory brick suitable for use unfired can be made with the super-coarse particles constituting as little as 25 percent by weight of the total coarse particles and the medium-coarse particles constituting as much as 75 percent of the total coarse particles. I have also found that a good basic refractory brick suitable for use without kiln firing can be made with the super-coarse particles constituting as much as 75 percent of the total coarse particles and the medium-coarse particles constituting as little as 25 percent of the total coarse particles. Likewise a good basic refractory brick suitable for use without kiln firing can be made with the super-coarse particles and the medium-coarse particles each constituting 50 percent by weight of the total coarse particles.

By the experiments I further establish that in making a basic refractory brick using these extremely coarse particles it is necessary to bond the brick by use of a bonding substance. It is very desirable to eliminate the kiln firing operation and use the brick unfired. It is also important that the fine particles be essentially magnesia, free from or substantially free from chrome ore. By observing these precautions bricks can be obtained which completely fill the mold, have strong corners and edges, and can satisfactorily withstand damage through transportation and installation.

In accordance with the invention, a refractory brick mixture for the manufacture of refractory bricks according to the present invention, for use without kiln firing, embodies a bonding substance, mixed with a refractory material which may be magnesia or a mixture of chrome ore and at least 20 percent by weight of magnesia.

The refractory mix includes refractory which is screened to form three different components, super-coarse, medium-coarse and fine, free from or low in particles of intermediate size.

The fine component is essentially magnesia free from chrome ore, small enough to pass through a screen having a size of 48 mesh, and making up between 20 and 50 percent by weight of the refractory particles.

All of the percentages referred to herein unless otherwise indicated are percentages by weight calculated on a dry basis. When referring herein to percentages of liquids such as acid, these are not included in the 100 percent base but are calculated on the dry weight of the refractory material, in addition to the 100 percent.

The total coarse particles comprise between 50 and 80 percent by weight of the refractory mix. The total coarse particles rest at least 90 percent by weight on a 28 mesh screen and they all pass through a 3 mesh screen.

The total coarse particles consist of two components which are separately introduced into the mix. The super-coarse particles pass through 3 mesh and preferably through 3.5 mesh, and rest at least 90 percent on a 6 mesh screen or preferably on an 8 mesh screen. The super-coarse particles make up from 25 to 75 percent by weight of the total coarse particles.

The medium-coarse particles pass at least 90 percent through a 6 mesh screen or preferably through an 8 mesh screen and rest on a 28 mesh screen.

The following examples describe particular embodiments of the invention:

*Example I*

A chrome-magnesite brick suitable for use in an open hearth furnace roof is made according to this example.

Refractory grade chrome ore is crushed, ground and screened over 3 screens in sequence having sizes of 3.5 mesh, 6 mesh and 28 mesh respectively. Two sizes of coarse particles are separated, one being super-coarse particles passing through 3.5 mesh and resting on 6 mesh, and the other size being medium-coarse particles passing through 6 mesh and resting on 28 mesh.

The fine chrome particles passing through 28 mesh are rejected entirely. By proper crushing the amount of rejected material is kept to a minimum.

Calcined magnesia of refractory grade is ground to pass through a 48 mesh screen and preferably through a 100 mesh screen.

The super-coarse and medium-coarse chrome particles are mixed in equal portions by weight and 65 parts by weight of these mixed coarse particles are mixed with 35 parts by weight of the fine magnesia particles.

With this mixture of chrome and magnesia particles is mixed a bonding substance which in one embodiment was 1 to 4 percent by weight of finely divided kaolin, preferably 2 percent, and in another embodiment was 1 to 7 percent by weight of iron powder passing through a 35 mesh screen, preferably 4 percent.

The mixture as thus described was moistened with water containing sulfuric acid in sufficient quantity so that the acid was one percent of the weight of the refractory mix and the water was suitably of the order of 3 to 4 percent of the weight of the refractory mix (both in addition to 100 percent). This mixture was then molded into refractory bricks in a brick press under a molding pressure of 8,000 to 15,000 p.s.i. or more and preferably 10,000 p.s.i.

The molded bricks were dried at a temperature in the range between 250 and 300° F., whereupon they were used in a furnace without kiln firing.

Good results were obtained and the bricks stood transport well and effectively filled out the mold.

*Example II*

The procedure of Example I is repeated, except that the super-coarse particles rest on 8 mesh and the medium-coarse particles pass through 8 mesh. The product is similar to that of Example I.

*Example III*

Magnesite-chrome bricks suitable for use in an open hearth furnace roof without kiln firing were made as follows:

Refractory grade chrome ore was crushed, ground and screened to produce coarse chrome particles as described in Example I or Example II. Calcined refractory grade magnesia was crushed, ground and screened over screens respectively having sizes of 3½ mesh, 8 mesh and 28 mesh to make two sizes of coarse particles following the general procedure explained in Example I. The two sizes of coarse magnesia particles thus obtained were mixed together in the proportions of 1 part by weight of super-coarse magnesia particles and two parts by weight of medium-coarse magnesia particles. The magnesia particles passing through 28 mesh were ground and screened until they passed through 48 mesh and in the preferable embodiment through 100 mesh.

35 percent by weight of the mixed super-coarse and medium-coarse chrome ore particles obtained above were mixed with 35 percent by weight of the mixed super-coarse and medium-coarse magnesia particles obtained above and 30 percent by weight of the fine magnesia particles obtained above. To this mixture was added in different embodiments kaolin and iron powder respectively, along with sulfuric acid and water, all as mentioned in Example I.

The bricks were molded and dried and were ready for use in an open hearth furnace roof without kiln firing. They filled out the mold satisfactorily and transported well and behaved well in service.

*Example IV*

The procedure of Example III is repeated, except that the separation screens are 3½ mesh, 10 mesh and 28 mesh. The product is similar to that of Example III.

*Example V*

Magnesia bricks free from chrome ore and suitable for use in electric steel melting furnaces were made according to the invention as follows:

The magnesia was prepared as in Example III or Example IV and the coarse particles were obtained by mixing one part by weight of super-coarse particles with two parts by weight of medium-coarse particles. Seventy parts by weight of these mixed coarse particles were mixed with thirty parts by weight of fine magnesia particles passed through 48 mesh and in the preferred embodiment through 100 mesh.

The brick was bonded with kaolin and iron powder in different embodiments, and water and sulfuric acid were added all as set forth in Example I and the bricks were molded and dried as there described and were then ready for use.

The resulting bricks were of good quality and gave good service and filled out the mold well and transported well to the point of use.

The invention can be used in making bricks which are made of magnesia free from chrome ore or from mixtures containing at least 20 percent of magnesia with chrome ore.

The coarse particles should be 50 to 80 percent of the refractory substance and the fine particles from 20 to 50 percent, by weight. The preferred proportion is 70 percent of coarse particles and 30 percent of fine particles by weight.

The mixture of coarse particles should contain at least 25 percent by weight of particles resting on the 6 mesh screen or preferably on the 8 mesh screen (less desirably on the 10 mesh screen).

The mesh used are Tyler standard mesh per linear inch with square openings.

It is of course well known that screens which are intended to remove particles smaller than 28 mesh usually do not completely remove all such particles so that the particles which are described as resting on 28 mesh may include up to 10 percent by weight of particles which could pass through a 28 mesh test screen. For this reason, these particles are herein described as being large enough to rest at least 90 percent by weight on a 28 mesh screen. Similar qualifications apply to particles which are screened to rest at least 90 percent on a 6 mesh screen, or an 8 mesh screen, or 10 mesh screen.

Furthermore it will be evident that commercial screens used in manufacturing processes need not have square openings but may have rectangular openings of greater length than width, the mesh being specified by the width. Thus for example a commercial screen intended to remove particles larger than 3.5 mesh will permit some particles to pass through its rectangular openings which would be retained on a 3.5 mesh test screen having square openings.

All such commercially prepared particles are intended to be covered by the mesh sizes stated herein.

In view of my invention and disclosure, variations and modifications to meet individual whim or particular need will doubtless become evident to others skilled in the art, to obtain all or part of the benefits of my invention without copying the process and product shown, and I therefore claim all such insofar as they fall within the reasonable spirit and scope of my claims.

Having thus described my invention what I claim as new and desire to secure by Letters Patent is:

1. The process of making a refractory brick which is of improved corner formation, suitable for use in a furnace without kiln firing, which comprises mixing together with a bonding substance separate components of super-coarse, medium-coarse and fine refractory particles of the class consisting of magnesia and mixtures of magnesia and chrome ore containing at least 20 percent of magnesia and the balance of the refractory material chrome ore, said fine particles being composed of magnesia through 48 mesh per linear inch free from chrome ore making up between 20 and 50 percent on the weight of the refractory particles, said super-coarse and medium-coarse particles together making up between 50 and 80 percent on the weight of the refractory particles, said super-coarse particles composing 25 to 75 percent on the weight of the total coarse particles and being through 3 mesh and at least 90 percent on 6 mesh, and said medium-coarse particles composing 25 to 75 percent on the weight of the total coarse particles and being at least 90 percent through 6 mesh and on 28 mesh, molding said refractory mix into brick and drying the brick.

2. The process of making a refractory brick which is of improved structure at the corners and suitable for use in a furnace without kiln firing, which comprises mixing together with a bonding substance separate components of super-coarse, medium-coarse and fine refractory particles of the class consisting of magnesia and mixtures of magnesia and chrome ore containing at least 20 percent of magnesia and the balance of the refractory material chrome ore by weight, said fine particles being composed of magnesia through 48 mesh per linear inch free from chrome ore making up between 20 and 50 percent on the weight of the refractory mix, said super-coarse and medium-coarse particles together making up between 50 and 80 percent on the weight of the refractory mix, said super-coarse particles composing 25 to 75 percent on the weight of the total coarse particles and being through 3.5 mesh and at least 90 percent on 8 mesh, said medium-coarse particles composing 25 to 75 percent on the weight of the total coarse particles and being at least 90 percent through 8 mesh and on 28 mesh, molding said refractory mix into brick and drying the brick.

3. The process of making a refractory brick which is of improved structure at the corners and suitable for use in a furnace without kiln firing, which comprises mixing together with a bonding substance separate components of super-coarse, medium-coarse and fine refractory particles of the class consisting of magnesia and mixtures of magnesia and chrome ore containing at least 20 percent of magnesia and the balance of the refractory material chrome ore by weight, said fine particles being composed of magnesia through 48 mesh per linear inch free from chrome ore making up between 20 and 50 percent on the weight of the refractory mix, said super-coarse and medium-coarse particles together making up between 50 and 80 percent on the weight of the refractory mix, said super-coarse particles composing 25 to 75 percent on the weight of the total coarse particles and being through 3.5 mesh and at least 90 percent on 10 mesh, said medium-coarse particles composing 25 to 75 percent on the weight of the total coarse particles and being at least 90 percent through 10 mesh and on 28 mesh, molding said refractory mix into brick and drying the brick.

4. The process of making a refractory brick which is of improved structure at the corners and suitable for use in a furnace without kiln firing, which comprises mixing together with a bonding substance separate components of super-coarse, medium-coarse and fine refractory particles of the class consisting of magnesia and mixtures of magnesia and chrome ore containing at least 20 percent of magnesia and the balance of the refractory material chrome ore by weight, said fine particles being composed of magnesia through 48 mesh per linear inch making up 30 percent on the weight of the refractory particles, said super-coarse and medium-coarse particles together making up 70 percent on the weight of the refractory particles, said super-coarse particles composing 25 to 75 percent on the weight of the total coarse particles and being through 3 mesh and at least 90 percent on 6 mesh, and said medium-coarse particles composing 25 to 75 percent on the weight of the total coarse particles and being at least 90 percent through 6 mesh and on 28 mesh, molding said refractory mix into brick and drying the brick.

5. The process of making a refractory brick which is of improved structure at the corners and suitable for use in a furnace without kiln firing, which comprises mixing together separate components of super-coarse, medium-coarse and fine refractory particles of the class consisting of magnesia, and mixtures of magnesia and chrome ore containing at least 20 percent of magnesia and the balance of the refractory material chrome ore by weight, said fine particles being composed of magnesia free from chrome ore and through 48 mesh making up between 20 and 50 percent on the weight of the refractory particles, said super-coarse and medium-coarse particles together making up between 50 and 80 percent on the weight of the refractory particles, said super-coarse particles composing 25 to 75 percent of the weight of the total coarse particles and being through 3 mesh and at least 90 percent on 6 mesh, and said medium-coarse particles composing 25 to 75 percent on the weight of the total coarse particles and being at least 90 percent through 6 mesh and on 28 mesh, mixing with the refractory particles between 1 and 4 percent by weight of kaolin, molding said refractory mix into brick, and drying the brick.

6. The process of making a refractory brick which is of improved structure at the corners and suitable for use in a furnace without kiln firing, which comprises mixing together separate components of super-coarse, medium-coarse and fine refractory particles of the class consisting of magnesia, and mixtures of magnesia and chrome ore containing at least 20 percent of magnesia and the balance of the refractory material chrome ore by weight, said fine particles being composed of magnesia free from chrome ore and through 48 mesh per linear inch making up between 20 and 50 percent on the weight of the refractory particles, said super-coarse and medium-coarse particles together making up between 50 and 80 percent on the weight of the refractory particles, said super-coarse particles composing 25 to 75 percent on the weight of the total coarse particles and being through 3 mesh and at least 90 percent on 6 mesh, and said medium-coarse particles composing 25 to 75 percent on the weight of the total coarse particles and being at least 90 percent through 6 mesh and on 28 mesh, mixing with the refractory particles between 1 and 7 percent by weight of iron powder, molding said refractory mix into brick and drying the brick.

7. A basic refractory brick of improved corner formation, unfired and suitable for use in a furnace without kiln firing, which comprises super-coarse, medium-coarse and fine refractory particles of the class consisting of magnesia and mixtures of magnesia and chrome ore containing at least 20 percent of magnesia and the balance of the refractory material chrome ore by weight, bonded together, said fine particles being composed of magnesia free from chrome ore and through 48 mesh per linear inch making up between 20 and 50 percent on the weight of the refractory particles, said super-coarse and medium-coarse particles together making up between 50 and 80 percent on the weight of the refractory particles, said super-coarse particles composing 25 to 75 percent on the weight of the total coarse particles and being through 3 mesh and at least 90 percent on 6 mesh, and said medium-coarse particles composing 25 to 75 percent on the weight of the total coarse particles and being at least 90 percent through 6 mesh and on 28 mesh.

8. A basic refractory brick of claim 7, in which said super-coarse particles are through 3.5 mesh and at least 90 percent on 8 mesh and said medium-coarse particles are at least 90 percent through 8 mesh and on 28 mesh.

9. A basic refractory brick of claim 1, in which the said super-coarse particles are through 3.5 mesh and at least 90 percent on 10 mesh and said medium-coarse particles are at least 90 percent through 10 mesh and on 28 mesh.

10. A basic refractory brick of claim 7, having 70 percent of total coarse particles and 30 percent of fine particles by weight.

11. A basic refractory brick of claim 7, having from 1 to 4 percent by weight of kaolin.

12. A basic refractory brick of claim 7, having from 1 to 7 percent by weight of iron powder.

References Cited in the file of this patent

UNITED STATES PATENTS

| | | |
|---|---|---|
| 1,992,482 | Heuer | Feb. 26, 1935 |
| 2,639,993 | Heuer | May 26, 1953 |
| 2,656,280 | Heuer | Oct. 30, 1953 |